US009710827B2

(12) United States Patent
Crolley et al.

(10) Patent No.: US 9,710,827 B2
(45) Date of Patent: *Jul. 18, 2017

(54) SYSTEM AND METHOD OF PROVIDING ADVERTISEMENTS TO VEHICLES

(71) Applicant: AT&T Intellectual Property I, L.P., Atlanta, GA (US)

(72) Inventors: Wayne Crolley, Little Rock, AR (US); Jeffrey Paul Johnson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/941,942

(22) Filed: Jul. 15, 2013

(65) Prior Publication Data

US 2014/0025500 A1    Jan. 23, 2014

Related U.S. Application Data

(63) Continuation of application No. 13/560,229, filed on Jul. 27, 2012, now Pat. No. 8,488,511, which is a continuation of application No. 13/036,137, filed on Feb. 28, 2011, now Pat. No. 8,248,986, which is a continuation of application No. 12/604,466, filed on Oct. 23, 2009, now Pat. No. 7,916,678, which is a continuation of application No. 11/549,324, filed on Oct. 13, 2006, now Pat. No. 7,646,740.

(51) Int. Cl.
*H04W 4/02*    (2009.01)
*G06Q 30/02*    (2012.01)
*H04W 64/00*    (2009.01)

(52) U.S. Cl.
CPC ..... *G06Q 30/0266* (2013.01); *G06Q 30/0261* (2013.01); *H04W 4/02* (2013.01); *H04W 64/00* (2013.01)

(58) Field of Classification Search
CPC ..... H04W 72/005; H04W 4/02; H04W 64/00; H04L 12/189; G06Q 30/0261; G06Q 30/0266
USPC ............................. 370/312; 455/456.1–456.6
See application file for complete search history.

(56) References Cited

U.S. PATENT DOCUMENTS

| 6,594,699 | B1 | 7/2003 | Sahai et al. |
| 7,103,368 | B2 * | 9/2006 | Teshima ..................... 455/456.3 |
| 7,646,740 | B2 | 1/2010 | Crolley et al. |
| 7,916,678 | B2 | 3/2011 | Crolley et al. |
| 2002/0070852 | A1 | 6/2002 | Trauner et al. |
| 2003/0028490 | A1 | 2/2003 | Miura et al. |
| 2003/0144906 | A1 | 7/2003 | Fujimoto et al. |
| 2003/0233275 | A1 | 12/2003 | Melvin |

(Continued)

*Primary Examiner* — Nathan Mitchell
*Assistant Examiner* — Dung Lam
(74) *Attorney, Agent, or Firm* — Hartman & Citrin LLC

(57) ABSTRACT

A communication device is removable and operable within a vehicle and is in communication with a data network as the communication device travels in the vehicle. Vehicle identification data is obtained from the communication device, and a type of media file supported by a media system of the vehicle is determined based upon the vehicle identification data. Media content is obtained in a format corresponding to the determined type of media file. When the communication device is within a desired range of a target location, the media content is transmitted to the communication device for presentation on the media system of the vehicle.

20 Claims, 3 Drawing Sheets

(56) References Cited

U.S. PATENT DOCUMENTS

| | | |
|---|---|---|
| 2004/0023647 A1 | 2/2004 | Mazzara et al. |
| 2004/0192351 A1 | 9/2004 | Duncan |
| 2005/0064861 A1* | 3/2005 | Nishida .................. 455/420 |
| 2005/0119827 A1 | 6/2005 | Willer et al. |
| 2006/0015580 A1* | 1/2006 | Gabriel et al. ............ 709/219 |
| 2006/0047415 A1* | 3/2006 | Groskreutz ............ H04H 20/57 |
| | | 455/12.1 |
| 2006/0073796 A1 | 4/2006 | Collavo et al. |
| 2006/0129553 A1 | 6/2006 | Simonds et al. |
| 2006/0154697 A1 | 7/2006 | Brailovskiy et al. |
| 2007/0061057 A1 | 3/2007 | Huang et al. |
| 2007/0118860 A1* | 5/2007 | Siemens et al. ............ 725/75 |
| 2007/0124043 A1* | 5/2007 | Ayoub .................. G06F 21/10 |
| | | 701/36 |
| 2007/0149247 A1* | 6/2007 | Wong ...................... 455/557 |
| 2007/0157260 A1* | 7/2007 | Walker ...................... 725/86 |

* cited by examiner

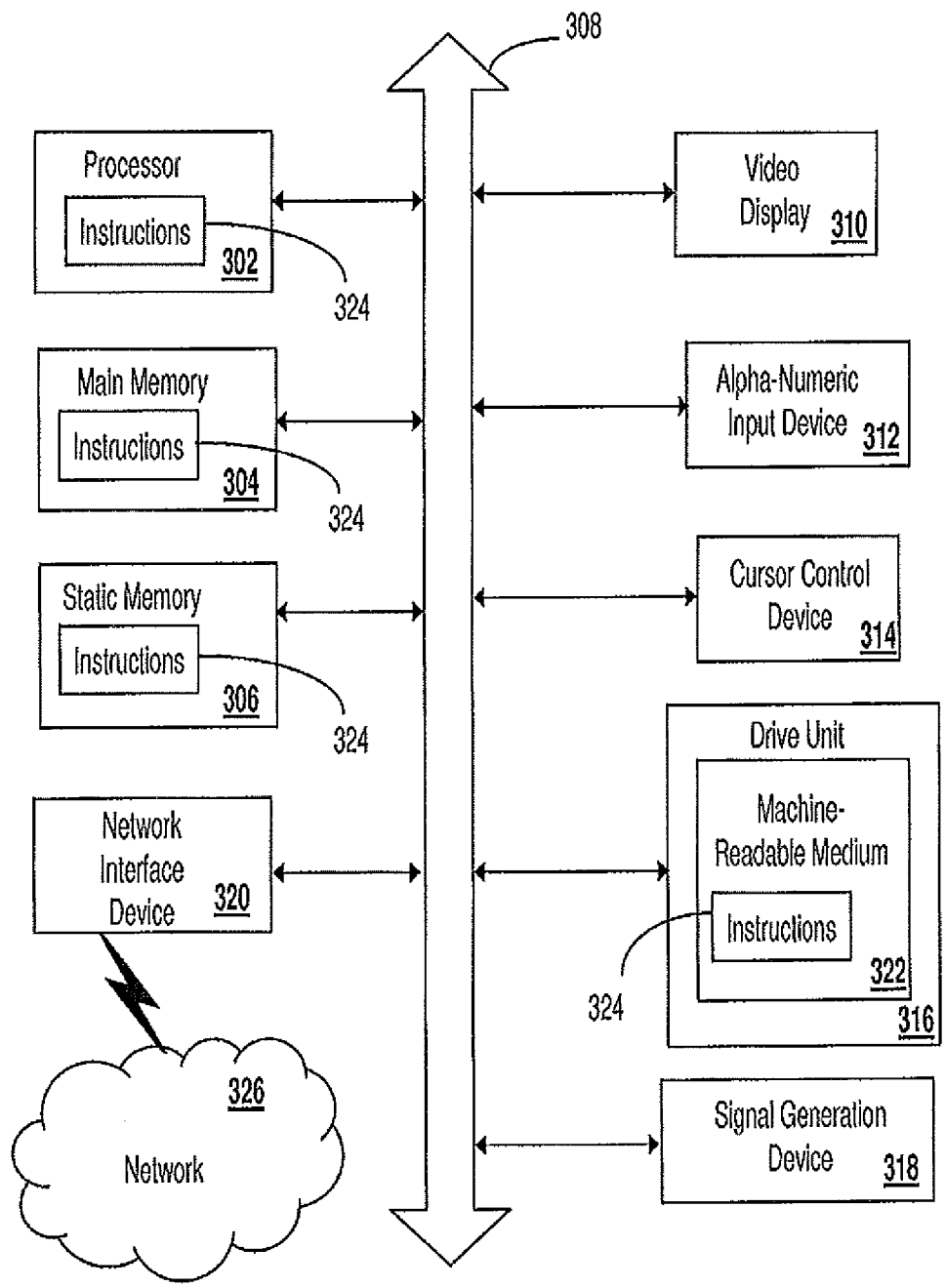
FIG. 3    300

SYSTEM AND METHOD OF PROVIDING ADVERTISEMENTS TO VEHICLES

CROSS-REFERENCE TO RELATED APPLICATIONS

This application is a continuation of and claims priority to U.S. patent application Ser. No. 13/560,229, filed Jul. 27, 2012, now U.S. Pat. No. 8,488,511, which is a continuation of and claims priority to U.S. patent application Ser. No. 13/036,137, filed Feb. 28, 2011, now U.S. Pat. No. 8,248,986, which is a continuation of and claims priority to U.S. patent application Ser. No. 12/604,466, filed Oct. 23, 2009, now U.S. Pat. No. 7,916,678, which is a continuation of and claims priority to U.S. patent application Ser. No. 11/549,324, filed Oct. 13, 2006, now U.S. Pat. No. 7,646,740.

FIELD OF THE DISCLOSURE

The present disclosure relates generally to wireless communications and more specifically to a system and method of providing advertisements to vehicles.

BACKGROUND

Portable communication devices, e.g., cellular telephones, portable digital assistants, 802.11 devices, are very useful for obtaining information while traveling. For example, a user can call an information service to obtain the location of a gas station, restaurant, etc. Further, a user can access the Internet or a Wide Area Network via a portable communication device and input a query in order to obtain information about a business, a local attraction, a civic event, or any other point of interest. These systems are not proactive and require an input from a user before information about a business, location, etc. is sent to the requesting device.

Additionally, GPS systems have been provided that can track the location of a user and show the location of the user on an electronic map. However, these systems include limited information and typically, the electronic map provided by the GPS system is simply a map with little other information, e.g., information about the hours of operation of a particular business or point of interest. Also, with the proliferation of various different device types and media requirements it is difficult to distribute an advertisement in a single format.

Accordingly, there is a need for an improved system and method of providing advertisements to vehicles.

BRIEF DESCRIPTION OF THE DRAWINGS

FIG. 3 depicts an exemplary diagrammatic representation of a machine in the form of a computer system within which a set of instructions, when executed, may cause the machine to perform any one or more of the methodologies disclosed herein.

DETAILED DESCRIPTION

Figure 1:
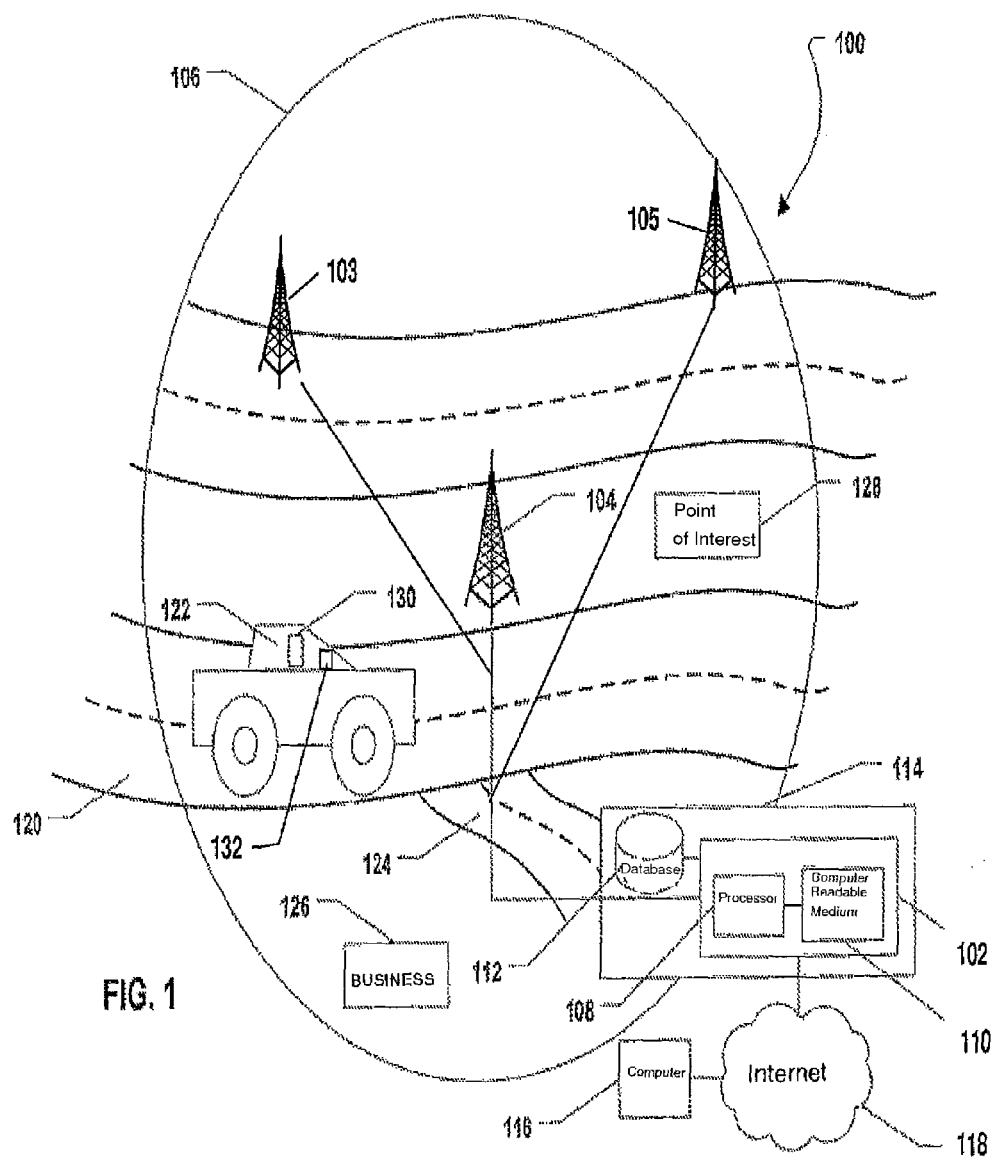
FIG. 1 depicts an exemplary block diagram of a wireless communication system over which one or more advertisements can be transmitted.

Embodiments in accordance with the present disclosure provide a system and method of providing advertisements to vehicles.

In a first embodiment of the present disclosure, a method of providing media content is provided. The method can operate in a server and can include determining a location of a portable communication device in communication with a data network as the communication device travels in a vehicle where the communication device is removable from and operable independent of the vehicle, determining whether the communication device is within a desired range of a target location, polling the communication device to determine a type of media file supported by a media system of the vehicle, obtaining media content in a format corresponding to the determined type of media file, transmitting the media content to the communication device for presentation on the media system of the vehicle when the communication device is determined to be within the desired range, determining whether the communication device is outside the desired range, and terminating transmission of the media content when the communication device is determined to be outside the desired range.

In a second embodiment of the present disclosure, a server is provided that can include a controller adapted to communicate with a wireless access point and a database where the wireless access point is deployed in proximity to a target location and where the database stores format information associated with a type of media file supported by a media system of a vehicle, determine a location of a communication device that can communicate with a data network independently of the media system as the communication device travels in the vehicle, determine whether the communication device is within a target region, determine the type of media file supported by the vehicle media system using the database, transmit media content in the desired format via the wireless access point to the communication device for presentation on the media system when the communication device enters the target region, and cease transmission of the media content when the communication device leaves the target region.

In a third embodiment of the present disclosure, a portable communication device is provided that can include a controller adapted to communicate with a wireless access point and a media system where the wireless access point is deployed in proximity to a target location and where the media system is integral with a vehicle, wherein the communication device is removable from and operable independent of the vehicle, obtain vehicle identification information associated with the vehicle, transmit the vehicle identification to a server via the wireless access point in response to a polling message transmitted from the server where a desired format of media content corresponding to a type of media file supported by the vehicle media system is determined using the vehicle identification, transmit location information to the server via the wireless access point where a location of the communication device is determined as the communication device travels in the vehicle, receive media content from the server via the wireless access point in the desired format when the communication device is within a desired range of the target location, and transmit the media content to the vehicle media system for presentation on a display of the media system.

Referring to FIG. 1, a system of advertising to wireless devices is shown and is generally designated 100. As shown, the system 100 includes a system server 102 coupled to a wireless antenna 104. The wireless antenna 104 provides a coverage area 106 for the system 100. As depicted in FIG. 1, the system server 102 includes a processor 108 and a computer readable medium 110 that is accessible to the processor 108. A database 112 is also coupled to the system server 102. In a particular embodiment, the database 112 includes vehicle information, e.g., the identifications of make, year, and models of motor vehicles and the media systems supported in said vehicles. Further, the database 112 can include a plurality of advertisements associated with one or more businesses within the coverage area provided by the system 100 shown in FIG. 1. As shown, the system server 102, the processor 108, the computer readable medium 110, and the database 112 can be co-located at a service provider 114.

FIG. 1 further shows that a computer 116 can be coupled to the system server 102 via the Internet or a Wide Area Network 118, A system manager or some other person, e.g., a subscriber, can communicate with the system server 102 using the computer 116. As illustrated in FIG. 1, wireless antennas 104 can be deployed in system 100 so that the coverage area 106 provided by the wireless antenna 104 overlaps a freeway 120. In a particular embodiment, the freeway 120 can be any type of roadway used to carry public transportation, e.g., one or more vehicles 122. Also, the freeway 120 can include at least one freeway exit 124 that provides access to one or more businesses 126. The wireless antenna 104 can be deployed so that it is adjacent to, or proximal to, the freeway exit 124. Further, the wireless antenna 104 can be deployed so that it is adjacent to, or proximal to, a point of interest 128.

Other wireless antennas 103 and 105 can be deployed throughout system 100. Like antenna 104, antennas 103 and 105 can be accessed by system server 102 to transmit and receive signals from the portable communication devices (PCDs) 130 as directed by system server 102, and can be used for locating the PCD 130 using common triangulation techniques. The antennas 103-105 can operate according to any communication protocol or standard including IEEE's 802 protocols such as 802.1-802.22 (e.g., WiFi, WiMax and so on), and cellular telephony standards (e.g., UMTS, CDMA, GSM, and so on), Ultra Wide Band (UWB), and Software Defined Radio (SDR)—just to mention a few.

In a particular embodiment, the system server 102 can include a computer program embedded within the computer readable medium 110. The computer program can include logic to execute a method that allows the system server 102 to monitor by way of antennas 103-105 or by location information supplied by the PCDs 130 the movement of a PCD 130 located in the vehicle 122 as it progresses along a highway. As the vehicle 122 and the PCD 130 approach the freeway exit 124, one or more advertisements associated with the business 126 that is accessible via the freeway exit 124 can be automatically transmitted to the PCD 130 and presented on a media system 132 of the vehicle 122.

The media system 132 can comprise any imaging technology such as a color Liquid Crystal Display (LCD) on a dashboard of the vehicle 122 or any other suitable location in the vehicle. The media system 132 can singly or in combination comprise an audio system such as used by a CD player or an FM or AM radio integrated in the vehicle 122. The PCD 130 can be an integral part of the vehicle's telemetry system which can access the media system 132, or can be coupled by common wireless or wireline interface means to a controller that manages the media system 132 of the vehicle 122.

In the case of a wireline interface, the PCD 130 can be coupled to the controller by way of a cradle that attaches to an electro-mechanical connector of the PCD 130. In the ease of a PCD 130 supporting a wireless interface, said device can, for example, support any number of the aforementioned wireless standards of IEEE. In the present disclosure, it will be assumed that the PCD 130 is a dual-mode device having a common transceiver element that supports one of the aforementioned cellular telephony protocols in a first mode for communicating with the wireless antennas 103, 104, and 105, and either a Bluetooth standard (IEEE 802.15) or a WiFi standard (IEEE 802.11 a, b, g, or n) as a second mode for communicating with the media system 132.

Information such as other services available via the freeway exit 124 can be presented on the media system 132. Further, as the vehicle 122 and the PCD 130 approach the point of interest 128, information related to the point of interest 128 can be automatically transmitted to the PCD 130 and presented on said media system 132, As described in detail below, other information, including traffic alerts, can be transmitted to the PCD 130 and presented on the media system 132.

Figure 2:
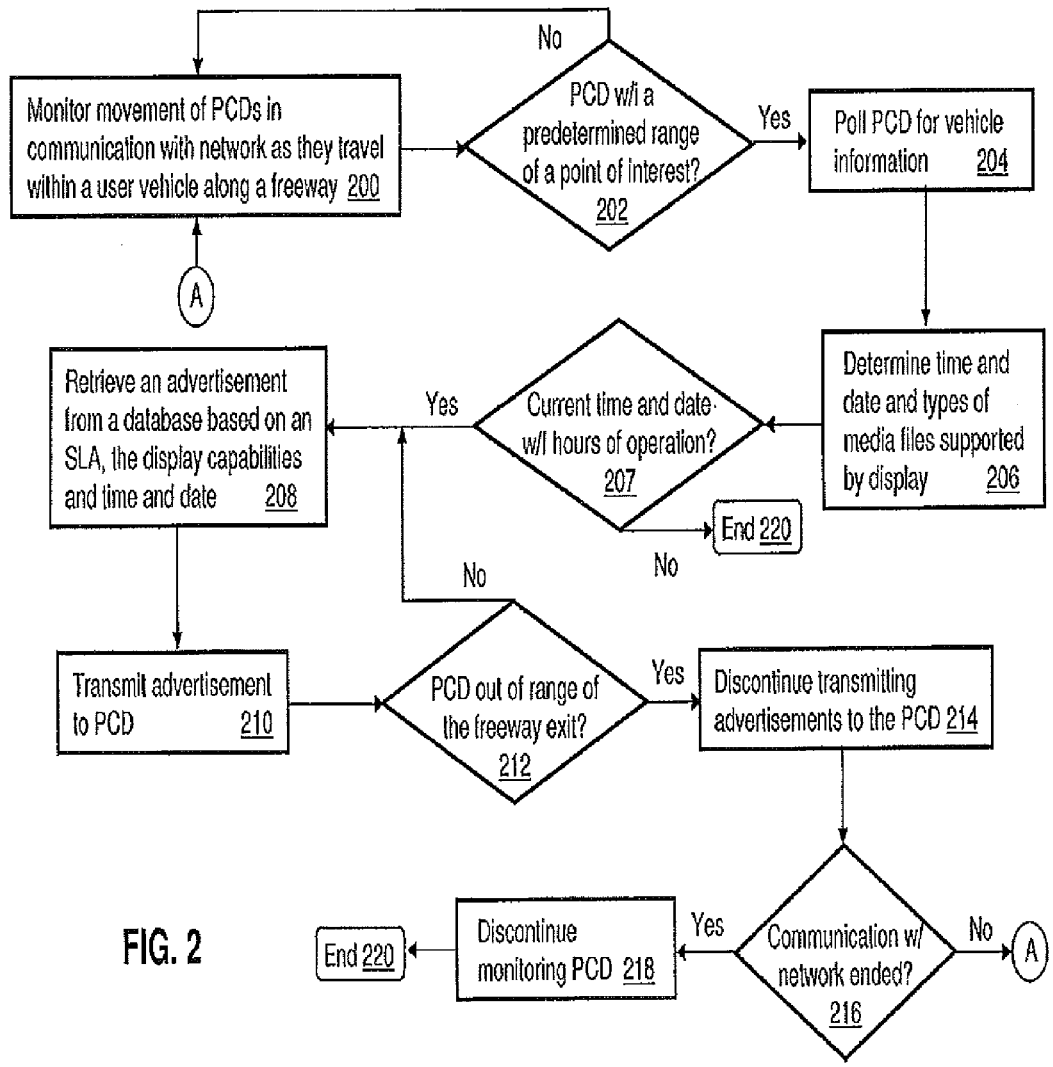
FIG. 2 depicts an exemplary flowchart of a method of transmitting advertisements associated one or more businesses at a freeway exit.

Referring to FIG. 2, a method of advertising to a media system 132 of a vehicle 122 is described and commences at block 200. At block 200, a system server 102 monitors the presence of and movement of a PCD 130 while it is in communication with a network of antennas 103-105 (referred to herein as a network) as it travels within a user vehicle 122 along a freeway 120, highway, etc. The location of the PCD 130 can be determined from GPS location fixes transmitted by the PCD 130 to the server 102 when requested thereby. The GPS location fix can be determined by a location element (such as a common GPS receiver) of the PCD 130. Alternatively, the server 102 can determine a location fix of the PCD 130 by way of a common triangulation technique using RF telemetry delivered by the wireless antennas 103, 104, and 105. Since most freeways are relatively linear, the server 102 can more easily track the movement of a PCD 130 and estimate when the PCD 130 will reach a particular location, e.g., a freeway exit 124, point of interest 128, etc.

At decision step 202, the server 102 determines whether the PCD 130 is within a predetermined range (e.g., a mile) of a freeway exit 124. If not, the logic returns to block 200 and the server 102 continues to monitor the location of the PCD 130. At decision step 202, if the PCD 130 is within a predetermined range of a freeway exit 124, the method moves to block 204 and the server 102 determines the capabilities of the media system 132 in the vehicle 122 according to vehicle identification polled by way of the PCD 130. The vehicle identification can include the make, model and year of the user vehicle 122. The vehicle identification can be preprogrammed in the PCD 130 or retrieved by the PCD 130 from a common telemetry system (or controller) operating in the vehicle 122. With the make, model and year of the vehicle 122, the server 102 can determine the type of media system 132 used in the vehicle 122 its dimensions, resolution, color capability, and so on. The server 102 uses the vehicle identification to query a database for the types of media files supported by the media system 132 of said vehicle 122.

In an illustrative embodiment, the media files supported by the media system 132 can be audio data files, video data files, still image data files, etc.

Particularly, the still image data files can be joint photographic experts group (JPEG) data files, graphics interchange format (GIF) data files, tagged image data file format (TIFF) data files, Adobe Photoshop (PSD) data files, portable networks graphics (PNG) data files, windows metadata file (WMF) data files, Hypertext (HTML), Java, Flash media files, or any other types of image data files that can be downloaded to and viewed at the media system 132.

Further, the video data files can be moving picture experts group (MPEG) data files, audio video interleave (AVI) data files, Windows media video (WMV) data files, advanced streaming format (ASF) data files, Quicktime (MOV) data files, Real Media (RM) data files, or any other type of video data files that can be downloaded to and viewed at media system 132.

In a particular embodiment, the audio data files can be MPEG audio layer three (MP3) data files, waveform audio format (WAV) data files, windows media audio (WMA) data files, OGG data files, Monkey's Audio digital data files (APE) data file, VOX data files, Real Audio (RA) data files, synthetic music mobile application format (MMF) data files, musical instrument digital interface (MID) data files, phrase format (SPF) data files, Qualcomm PureVoice audio data files (QCP) or any other sound data files that can be listened to at the portable computing device. In an illustrative embodiment, real-time voice and video can be transmitted using the real-time protocol (RTP) and the video datagram protocol (VDP).

At block 206, the server 102 determines the time and date. If the current time and date is determined by the server 102 in step 207 to be within the hours of operation of the one or more business associated with the advertisements to be distributed, then the server 102 proceeds to block 208. Otherwise, the server 102 terminates operation in step 220.

Proceeding to block 208, the server 102 retrieves an advertisement from a database. In a particular embodiment, the advertisement is associated with a business 126 that is accessible via the freeway exit 124 and the server 102 retrieves the advertisement based on the capabilities of the media system 132 as determined in step 204 and the time and date determined above. Further, in a particular embodiment, the advertisement is retrieved based on a service level agreement that is associated with the business 126.

In an illustrative embodiment, the service level agreement can provide for four tiers of service. For example, the service level agreement can provide a first service tier that provides for text message advertisements, a second service tier that provides for still graphical advertisements, a third service tier that provides for streaming video and audio advertisements, and a fourth service tier that provides for real-time voice and video advertisements. Moving to block 210, the server 102 transmits the advertisement to the PCD 130 based on the service tier and in a format supported by the particular media system 132 of the vehicle 122 in which the PCD 130 is located.

In a particular embodiment, advertising customers (i.e., the businesses sponsoring the advertisements) can be charged based on the service level agreement. For example, a fourth service tier advertisement may be the most expensive advertisement and the first service tier advertisement may be the least expensive advertisement. Since the server 102 polls a PCD 130 to determine a supported media type before sending an advertisement, advertisements are delivered in the supported format to be received and viewed at the media system 132. Further, an advertising customer is charged for those advertisements delivered to the media system 132. In other words, an advertising customer may select a fourth service tier, but the advertising customer may only be charged for fourth service tier advertisements when real-time voice and video can be received and viewed at a particular media system 132.

Additionally, since the server 102 determines the time and date before transmitting advertisements, advertisements that are associated with a particular business 126 may not be sent if the business 126 is closed. Further, by monitoring the movement of a PCD 130 while it is in communication with a network as it travels within a user vehicle 122 along a freeway 120, advertisements can be sent for a business 126 at the exit 124 by which the business 126 can be accessed. In an alternative embodiment, the server 102 can begin transmitting advertisements one or more exits before the exit 124 by which the business 126 can be accessed. An advertisement customer can pay extra to have the server 102 send advertisements to media systems 132 by way of the PCDs 130 one or more exits before the exit 124 by which the business 126 can be accessed. For example, the greater the number of exits before the exit 124 associated with the business 126 at which advertisements are sent, the greater the advertising fee may be charged.

Continuing to decision step 212, the server 102 determines whether the PCD 130 has moved out of range of the freeway exit 124. If not, the method returns to block 208, and the server retrieves another advertisement from the database and continues as described herein. At decision step 212, when the server 102 determines that the PCD 130 has moved out of range of the freeway exit 124, the method moves to block 214 and the server discontinues transmitting advertisements to the PCD 130. Next, at decision step 216, the server 102 determines whether the PCD's 130 communication with the network has ended. If not, the method returns to block 200 and continues as described herein. On the other hand, if the communication with the network has ended, the method moves to block 218 and the server 102 discontinues monitoring the PCD 130. The method then ends at state 220.

Upon reviewing the foregoing embodiments of the present disclosure, it would be evident to an artisan with ordinary skill in the art that said embodiments can be modified, reduced, or enhanced without departing from the scope and spirit of the claims described below. For example, the server 102 can be programmed to monitor traffic at each exit approached by a vehicle 122 carrying a PCD 130. If there is heavy congestion at a particular exit, the server 102 can direct one of the antennas 103-105 to transmit to the PCD 130 for presentation at the media system 132 a traffic alert corresponding to said congestion. This is but one enhancement or modification that can be applied to the present disclosure. Accordingly, the reader is directed to the claims below for a fuller understanding of the breadth and scope of the present disclosure.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions 324 (e.g., software) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   determining, by a system comprising a processor, a location of a communication device positioned within a vehicle;
   determining, by the system, based at least in part on the location of the communication device, whether the vehicle is at a specified location with respect to a target location;
   polling, by the system, the communication device for identification data of the vehicle;
   receiving, by the system, from the communication device, the identification data of the vehicle;
   determining, by the system, based on the identification data of the vehicle received from the communication device, a type of a media system of the vehicle;
   determining, by the system, a type of media file supported by the type of the media system of the vehicle; and
   facilitating, by the system, in response to determining that the vehicle is at the specified location with respect to the target location, a delivery of media content, to the communication device for display on the media system, in a format corresponding to the type of media file supported by the type of the media system of the vehicle.

2. The method of claim 1, further comprising determining, by the system, whether the location of the communication device is outside a desired range of the target location, wherein the delivery of the media content is terminated when the location of the communication device is determined to be outside the desired range.

3. The method of claim 1, wherein the media content comprises an advertisement.

4. The method of claim 3, further comprising retrieving the advertisement for the delivery to the communication device based at least in part on a service tier of a service level agreement of a business associated with the advertisement and the type of media file supported by the type of the media system of the vehicle.

5. The method of claim 1, wherein determining the type of media file supported by the type of the media system of the vehicle comprises querying a database, according to the type of the media system of the vehicle determined based on the identification data of the vehicle, to determine the type of media file supported by the media system of the vehicle, wherein the identification data of the vehicle comprises a make, a model, and a year of the vehicle.

6. The method of claim 1, wherein the media content is retrieved for the delivery to the communication device based at least in part on a service tier of a service level agreement of a business associated with the media content, and wherein the business is charged for the delivery of the media content based at least in part on the service tier.

7. The method of claim 1, wherein the communication device is removable from and operable independent of the vehicle.

8. A system comprising:
   a processor; and
   a computer readable medium storing instructions that, when executed by the processor, cause the processor to perform operations comprising
      determining a location of a communication device positioned within a vehicle,
      determining, based at least in part on the location of the communication device, whether the vehicle is at a specified location with respect to a target location,
      polling the communication device for identification data of the vehicle,
      receiving, from the communication device, the identification data of the vehicle,
      determining, based on the identification data of the vehicle received from the communication device, a type of a media system of the vehicle,
      determining a type of media file supported by the type of the media system of the vehicle, and
      facilitating, in response to determining that the vehicle is at the specified location with respect to the target location, a delivery of media content, to the communication device for display on the media system, in a format corresponding to the type of media file supported by the type of the media system of the vehicle.

9. The system of claim 8, wherein the operations further comprise determining whether the location of the communication device is outside a desired range of the target location, wherein the delivery of the media content is terminated when the location of the communication device is determined to be outside the desired range.

10. The system of claim 8, wherein the media content comprises an advertisement.

11. The system of claim 10, wherein the operations further comprise retrieving the advertisement for the delivery to the communication device based at least in part on a service tier of a service level agreement of a business associated with the advertisement and the type of media file supported by the type of the media system of the vehicle.

12. The system of claim 8, wherein determining the type of media file supported by the type of the media system of the vehicle comprises querying a database, according to the type of the media system of the vehicle determined based on the identification data of the vehicle, to determine the type of media file supported by the media system of the vehicle, wherein the identification data of the vehicle comprises a make, a model, and a year of the vehicle.

13. The system of claim 8, wherein the media content is retrieved for the delivery to the communication device based at least in part on a service tier of a service level agreement of a business associated with the media content, and wherein the business is charged for the delivery of the media content based at least in part on the service tier.

14. The system of claim 8, wherein the communication device is removable from and operable independent of the vehicle.

15. A non-transitory computer readable medium storing instructions that, when executed by a processor of a system, cause the processor to perform operations comprising:
   determining a location of a communication device positioned within a vehicle;
   determining, based at least in part on the location of the communication device, whether the vehicle is at a specified location with respect to a target location;
   polling the communication device for identification data of the vehicle;
   receiving, from the communication device, the identification data of the vehicle;
   determining, based on the identification data of the vehicle received from the communication device, a type of a media system of the vehicle;
   determining a type of media file supported by the type of the media system of the vehicle; and
   facilitating, in response to determining that the vehicle is at the specified location with respect to the target location, a delivery of media content, to the communication device for display on the media system, in a format corresponding to the type of media file supported by the type of the media system of the vehicle.

16. The non-transitory computer readable medium of claim 15, wherein the operations further comprise determining whether the location of the communication device is outside a desired range of the target location, wherein the delivery of the media content is terminated when the location of the communication device is determined to be outside the desired range.

17. The non-transitory computer readable medium of claim 15, wherein the media content comprises an advertisement.

18. The non-transitory computer readable medium of claim 17, wherein the operations further comprise retrieving the advertisement for the delivery to the communication device based at least in part on a service tier of a service level agreement of a business associated with the advertisement and the type of media file supported by the type of the media system of the vehicle.

19. The non-transitory computer readable medium of claim 15, wherein determining the type of media file supported by the type of the media system of the vehicle comprises querying a database, according to the type of the media system of the vehicle determined based on the identification data of the vehicle, to determine the type of media file supported by the media system of the vehicle, wherein the identification data of the vehicle comprises a make, a model, and a year of the vehicle.

20. The non-transitory computer readable medium of claim 15, wherein the communication device is removable from and operable independent of the vehicle.

\* \* \* \* \*